United States Patent
Ahn

(10) Patent No.: US 10,394,383 B2
(45) Date of Patent: Aug. 27, 2019

(54) TOUCH PANEL LIQUID CRYSTAL DISPLAY DEVICE AND METHOD OF DRIVING THE SAME

(71) Applicant: LG DISPLAY CO., LTD., Seoul (KR)

(72) Inventor: Seung-Kuk Ahn, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/797,883

(22) Filed: Oct. 30, 2017

(65) Prior Publication Data
US 2018/0121022 A1    May 3, 2018

(30) Foreign Application Priority Data

Oct. 31, 2016    (KR) .................... 10-2016-0143985

(51) Int. Cl.
| | |
|---|---|
| G06F 3/041 | (2006.01) |
| G06F 3/044 | (2006.01) |
| G02F 1/1333 | (2006.01) |
| G02F 1/1362 | (2006.01) |

(52) U.S. Cl.
CPC ............ *G06F 3/0418* (2013.01); *G06F 3/044* (2013.01); *G06F 3/0412* (2013.01); *G02F 1/13338* (2013.01); *G02F 1/136286* (2013.01); *G06F 2203/04107* (2013.01)

(58) Field of Classification Search
CPC .............. G06F 3/0418; G06F 3/044; G06F 2203/04107; G02F 1/13338; G02F 1/136286
See application file for complete search history.

(56) References Cited

U.S. PATENT DOCUMENTS

| | | | | |
|---|---|---|---|---|
| 9,501,195 B1* | 11/2016 | Kim | .................... | G02F 1/13338 |
| 2010/0214230 A1* | 8/2010 | Chu | .................... | C03C 17/2453 |
| | | | | 345/173 |
| 2010/0215931 A1* | 8/2010 | Chu | .................... | C03C 17/3417 |
| | | | | 428/216 |
| 2011/0248962 A1* | 10/2011 | Poupyrev | ................ | G06F 3/016 |
| | | | | 345/175 |
| 2013/0147833 A1* | 6/2013 | Aubauer | ............... | G06F 3/0416 |
| | | | | 345/619 |

(Continued)

FOREIGN PATENT DOCUMENTS

KR    10-1633654 B1    6/2016

*Primary Examiner* — Sejoon Ahn
(74) *Attorney, Agent, or Firm* — Birch, Stewart, Kolasch & Birch, LLP

(57) ABSTRACT

A touch panel liquid crystal display device and a method of driving the same are discussed. The touch panel liquid crystal display device in one embodiment includes a thin film transistor array substrate including a plurality of gate lines, a plurality of data lines, and a plurality of common electrodes, a color filter array substrate including a black matrix layer and a color filter layer, and an indium tin oxide (ITO) film of a plurality of blocks on the color filter array substrate for touch sensing, wherein a scan signal, a data signal, and a common voltage are applied to the plurality of gate lines, the plurality of data lines, and the plurality of common electrodes, respectively, and the ITO film of the plurality of blocks is grounded, during a display period, and a load free driving (LFD) signal is applied to the plurality of gate lines, the plurality of data lines, and the plurality of common electrodes.

15 Claims, 9 Drawing Sheets

(56) References Cited

U.S. PATENT DOCUMENTS

| | | | | |
|---|---|---|---|---|
| 2013/0342479 A1* | 12/2013 | Pyo | ............................ | G09G 3/00 345/173 |
| 2014/0111473 A1* | 4/2014 | Yang | ........................ | G06F 3/044 345/174 |
| 2014/0232691 A1* | 8/2014 | Lee | .......................... | G06F 3/044 345/174 |
| 2014/0320446 A1* | 10/2014 | Kim | .......................... | G06F 3/044 345/174 |
| 2015/0205406 A1* | 7/2015 | Zhou | ...................... | G06F 3/0412 345/174 |
| 2015/0309634 A1* | 10/2015 | Lee | ........................ | G06F 3/0412 345/173 |
| 2016/0291773 A1* | 10/2016 | Wang | ........................ | G06F 3/044 |
| 2017/0290210 A1* | 10/2017 | Maeyama | ............. | H05K 9/0054 |

* cited by examiner

TOUCH PANEL LIQUID CRYSTAL DISPLAY DEVICE AND METHOD OF DRIVING THE SAME

CROSS-REFERENCE TO RELATED APPLICATIONS

This application claims the priority benefit of Korean Patent Application No. 10-2016-0143985, filed on Oct. 31, 2016, which is hereby incorporated by reference as if fully set forth herein.

BACKGROUND OF THE INVENTION

Field of the Invention

The present invention relates to a touch panel liquid crystal display device and a method for driving the same and, more particularly, to a touch panel liquid crystal display device and a method of driving the same for enhancing touch sensing performance and improving electromagnetic interface (EMI) noise.

Discussion of the Related Art

Along with development of multimedia, a flat panel display device has increasingly become important. In accordance with such a trend, flat panel display devices such as a liquid crystal display (LCD) device, a plasma display device, or an organic light emitting diode (OLED) display device has been commercialized.

Among flat panel display devices, the liquid crystal display (LCD) device has been widely used as a mobile flat panel display device because it has excellent image quality, light weight, thin thickness, and low power consumption. Also, the liquid crystal display (LCD) device has been applied to a variety of products such as notebooks, computer monitors, and televisions.

Particularly, among LCD devices, a touch panel LCD device is widely used. The touch panel LCD device includes a touch panel stacked on the LCD device. The touch panel senses a touch point at which a finger or a stylus pen comes in contact with the LCD device through variation in electrical characteristics such as resistance or capacitance at the touch point and outputs information corresponding to the touch point or performs an operation.

An application range of such the touch panel LCD device has been extended to small-size portable terminals, office devices, mobile phones, etc., as a user interface.

However, a scheme in which the touch panel is additionally stacked on the LCD device increases the thickness of the LCD device, thereby limiting to a thin shape, reducing transmittance efficiency of light through the stacked panel, and increasing manufacturing costs.

To address the above problems, an in-cell type touch panel LCD device in which a touch sensor is embedded in a pixel region thereof has been proposed.

FIGS. 1 and 2 are schematic cross-sectional views illustrating only a part to which a signal voltage is externally applied in an in-cell type touch panel LCD device according to a related art. In FIG. 1, an indium tin oxide (ITO) film having a low resistance is used for touch sensing and, in FIG. 2, a Y3 film having a high resistance is used for touch sensing.

The in-cell type touch panel LCD device according to the related art has a structure, as illustrated in FIG. 1, in which a plurality of gate lines Gate, a plurality of data lines Source, and a plurality of common electrodes Vcom are formed on a thin-film transistor (TFT) array substrate 1, and a black matrix 3 for preventing color mixture of subpixels and a color filter layer 4 formed in each pixel region between the black matrixes 3 are formed on the bottom surface of a color filter array substrate 2.

In addition, an ITO film 5 having a relatively low resistance (a few hundred $\Omega$ to a few K$\Omega$) is formed for touch sensing on the top surface of the color filter array substrate 2. An upper polarizing plate 7 and a lower polarizing plate 6 are formed on the top surface of the ITO film 5 and the bottom surface of the TFT array substrate 1, respectively. The ITO film 5 is formed in an integrated form with the color filter array substrate 2 in entirety on the top surface of the color filter array substrate 2.

A liquid crystal layer is formed between the TFT array substrate 1 and the color filter array substrate 2.

The ITO film 5 having a low resistance is formed on the substrate to sense touch through self-capacitance. However, since the ITO film 5 is grounded with a low resistance, charges generated during touch leak externally through the ITO film 5. Therefore, when a finger touches the touch panel, the generation of the finger capacitance is disturbed, thereby deteriorating touch sensing performance.

Accordingly, a Y3 film 8 having a high resistance (a few tens of M$\Omega$) is formed instead of the ITO film 5 in order to improve touch sensing performance.

The Y3 film 8 is a high-resistance transparent film.

That is, as illustrated in FIG. 2, a plurality of gate lines Gate, a plurality of data lines Source, and a plurality of common electrodes Vcom are formed on a TFT array substrate 1, and a black matrix 3 for preventing color mixture of subpixels and a color filter layer 4 formed in each pixel region between the black matrixes 3 are formed on the bottom surface of a color filter array substrate 2.

In addition, the Y3 film 8 having a relatively high resistance (a few tens of M$\Omega$) is formed on the top surface of the color filter array substrate 2. An upper polarizing plate 7 and a lower polarizing plate 6 are formed on the top surface of the Y3 film 8 and the bottom surface of the TFT array substrate 1, respectively. The Y3 film 8 is formed in an integrated form with the color filter array substrate 2 in entirety on the top surface of the color filter array substrate 2.

A liquid crystal layer is formed between the TFT array substrate 1 and the color filter array substrate 2.

Therefore, the touch panel LCD device of FIG. 2 using the high-resistance Y3 film for touch sensing has better touch sensing performance than the touch panel LCD device of FIG. 1 using the low-resistance ITO film for touch sensing.

FIG. 3 is a waveform chart illustrating driving of the touch panel LCD device of FIG. 1, and FIG. 4 is a waveform chart illustrating driving of the touch panel LCD device of FIG. 2.

As illustrated in FIGS. 3 and 4, driving of the touch panel LCD device is divided into a display period and a touch (sensing) period.

During the display period, a scan signal is sequentially applied to the plurality of gate lines, a data voltage is applied to the plurality of data lines, and a common voltage is applied to the plurality of common electrodes Vcom, thereby displaying an image.

During the touch sensing period, a load free driving (LFD) signal such as a square wave is applied to the plurality of gate lines, the plurality of data lines, and the plurality of common electrodes Vcom, thereby sensing touch.

The ITO film 5 having a low resistance or the Y3 film 8 having a high resistance is grounded (GND) during both the display period and the touch sensing period.

The touch panel LCD device of FIG. 1 uses the ITO film 5 having a low resistance (a few hundred Ω to a few kΩ). Therefore, as illustrated in FIG. 3, even though the LFD signal such as the square wave is applied to the plurality of gate lines Gate, the plurality of data lines Source, and the plurality of common electrodes Vcom during the touch sensing period, the LFD signal is not induced in the ITO film 5.

However, in the touch panel LCD device of FIG. 2 using the high-resistance Y3 film 8, the Y3 film 8 has a high resistance (a few tens of MΩ). Therefore, as illustrated in FIG. 4, if the LFD signal such as the square wave is applied to the plurality of gate lines Gate, the plurality of data lines Source, and the plurality of common electrodes Vcom during the touch sensing period, the LFD signal is induced in the Y3 film 8. Accordingly, electromagnetic interference (EMI) noise occurs in the top surface of a panel.

That is, touch sensing performance is deteriorated in the touch panel LCD device of FIG. 1 using the low-resistance ITO film and EMI noise occurs in the touch panel LCD device of FIG. 2 using the high-resistance Y3 film.

SUMMARY OF THE INVENTION

Accordingly, the present invention is directed to a touch panel LCD device and a method of driving the same that substantially obviate one or more problems due to limitations and disadvantages of the related art.

An object of the present invention is to provide a touch panel LCD device capable of enhancing touch sensing performance and improving EMI noise by dividing a bottom ITO film into a plurality of blocks, applying an LFD signal to a plurality of gate lines, a plurality of data lines, and a plurality of common electrodes during a touch sensing period, and sequentially applying the LFD signal to the bottom ITO film of the plurality of blocks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel liquid crystal display device includes a thin film transistor array substrate including a plurality of gate lines, a plurality of data lines, and a plurality of common electrodes, a color filter array substrate including a black matrix layer and a color filter layer, and an indium tin oxide (ITO) film of a plurality of blocks on the color filter array substrate for sensing touch, wherein a scan signal, a data signal, and a common voltage are applied to the plurality of gate lines, the plurality of data lines, and the plurality of common electrodes, respectively, and the ITO film of the plurality of blocks is grounded, during a display period, and a load free driving (LFD) signal is applied to the plurality of gate lines, the plurality of data lines, and the plurality of common electrodes and the LFD signal is sequentially applied to the ITO film of the plurality of blocks, during a touch sensing period.

In another aspect of the present invention, a method of driving a touch panel liquid crystal display device is disclosed. The touch panel liquid crystal display device includes a liquid crystal panel having a plurality of gate lines, a plurality of data lines, and a plurality of common electrodes and an indium tin oxide (ITO) film of a plurality of blocks on the liquid crystal panel. The method of driving includes applying a scan signal, a data signal, and a common voltage to the plurality of gate lines, the plurality of data lines, and the plurality of common electrodes, respectively, and the ITO film of the plurality of blocks is grounded, during a display period and applying a load free driving (LFD) signal to the plurality of gate lines, the plurality of data lines, and the plurality of common electrodes, and the LFD signal is sequentially applied to the ITO film of the plurality of blocks, during a touch sensing period.

A ground signal may be applied to the ITO film of the blocks during a duration in which the LFD signal is not applied during the touch sensing period.

The LFD signal may be sequentially applied to the ITO film of each of the plurality of blocks.

The LFD signal may be simultaneously applied to the ITO film of two or three adjacent blocks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Figure 1:
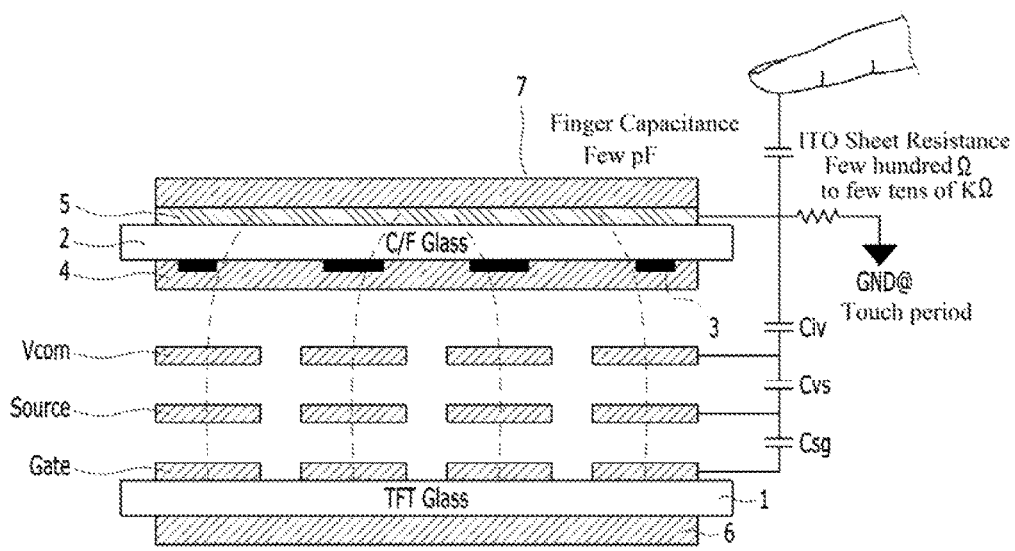
FIG. 1 is schematic cross-sectional views of an in-cell type touch panel LCD device using a low-resistance ITO film according to a related art.
Figure 2:
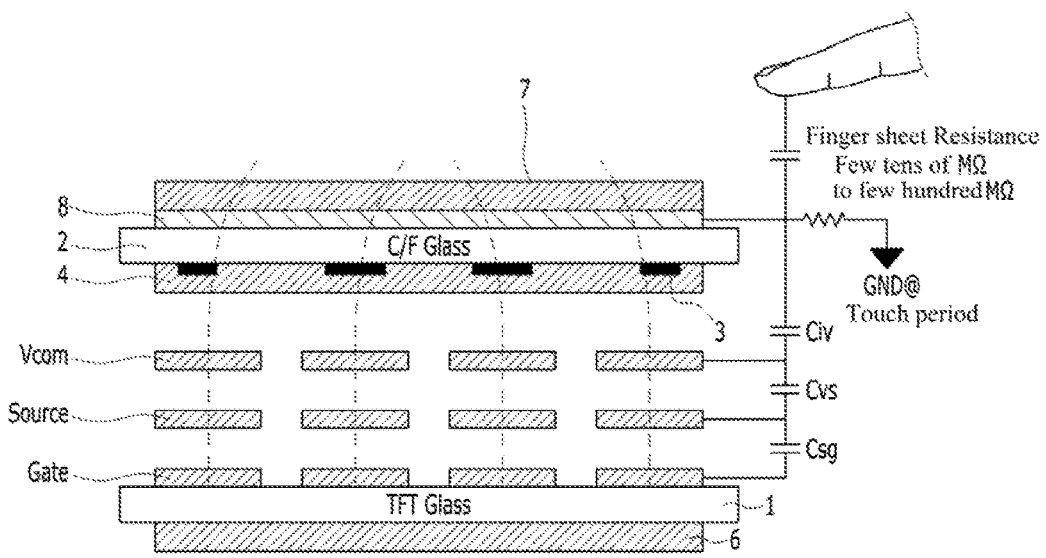
FIG. 2 is a schematic cross-sectional view of an in-cell type touch panel LCD device using a high-resistance Y3 film according to a related art.
Figure 3:
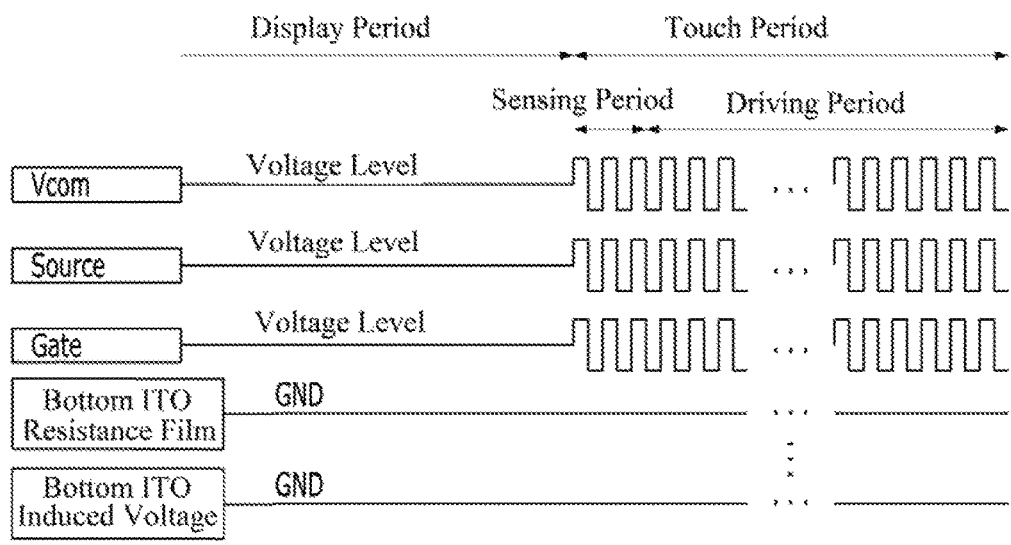
FIG. 3 is a waveform chart illustrating driving of the touch panel LCD device of FIG. 1.
Figure 4:
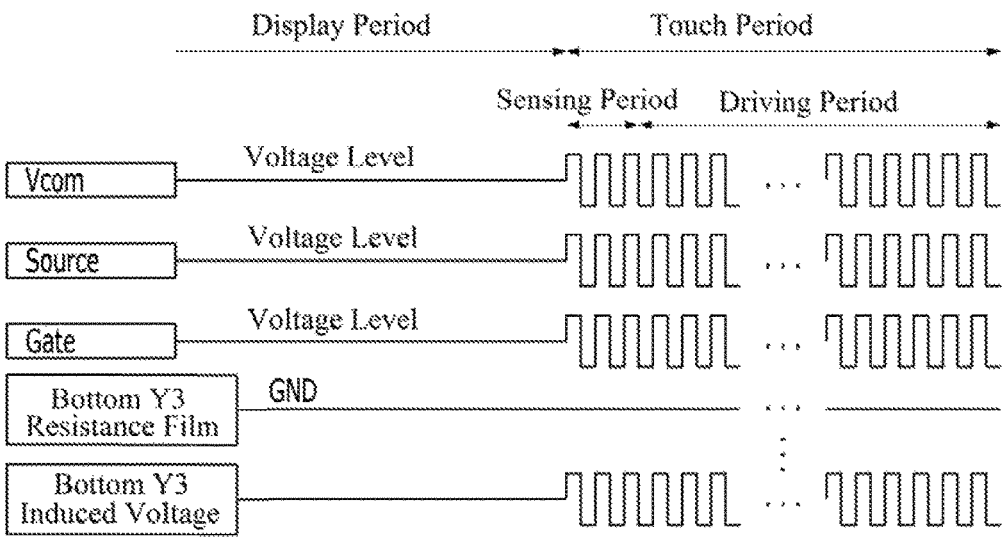
FIG. 4 is a waveform chart illustrating driving of the touch panel LCD device of FIG. 2.
Figure 5:
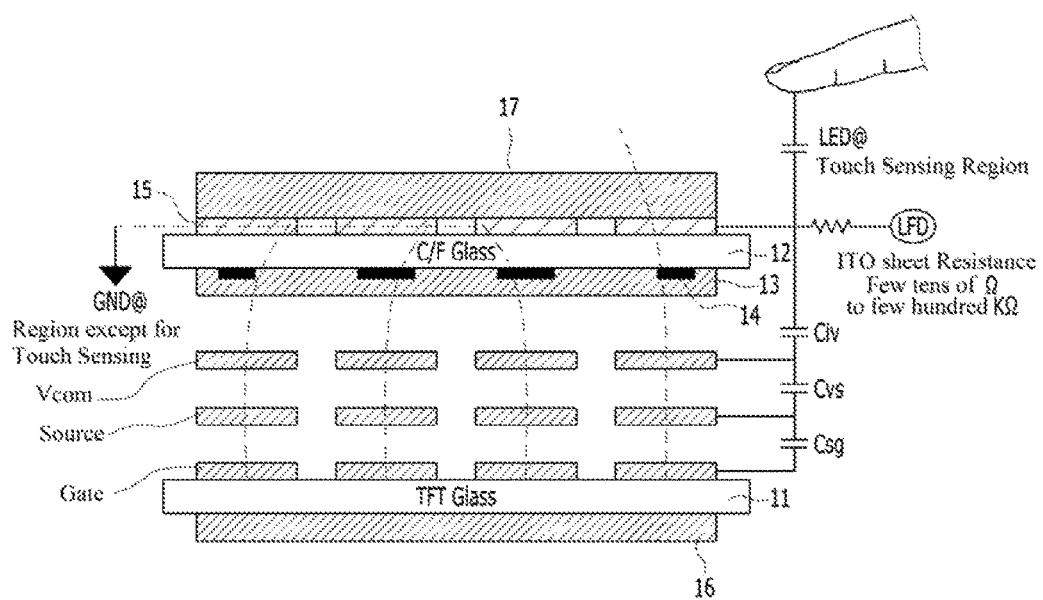
FIG. 5 is schematic cross-sectional view of an in-cell type touch panel LCD device using a low-resistance ITO film according to an embodiment of the present invention.

FIG. 5 is schematic cross-sectional view of an in-cell type touch panel LCD device using a low-resistance ITO film according to an embodiment of the present invention. All the components of the in-cell type touch panel LCD device according to all embodiments of the present invention are operatively coupled and configured.

The in-cell type touch panel LCD device according to the embodiment(s) of the present invention has a structure, as illustrated in FIG. 5, in which a plurality of gate lines Gate, a plurality of data lines Source, and a plurality of common electrodes Vcom are formed on a TFT array substrate 11, and a black matrix 13 for preventing color mixture of subpixels and a color filter layer 14 formed in each pixel region between the black matrixes 13 are formed on the bottom surface of a color filter array substrate 12.

Herein, the plurality of common electrodes Vcom simultaneously perform functions of a display electrode for driving display and a touch electrode for touch sensing. In other words, driving of an in-cell type touch panel according to the present invention is time-divided into a display period and a touch period. During the display period, the in-cell type touch panel uses the plurality of common electrodes Vcom as the display electrode for driving display by applying a common voltage to the plurality of common electrodes Vcom on the TFT array substrate. During the touch period, the in-cell type touch panel uses the plurality of common electrodes as the touch electrode for sensing touch by applying a touch scan signal. In this way, since the plurality of common electrodes for driving display are usable as the touch electrodes, the touch electrodes for sensing touch of the panel are not additionally needed. Accordingly, a thin and compact touch panel may be configured as compared with a general add-on or on-cell type touch panel.

In addition, the in-cell type touch panel LCD device according to the embodiment(s) of the present invention has a structure in which an ITO film 15 having a relatively low resistance (a few tens of Ω to a few hundred kΩ) is formed for sensing touch on the top surface of the color filter array substrate 12 and an upper polarizing plate 17 and a lower polarizing plate 16 are formed on the top surface of the ITO film 15 and the bottom surface of the TFT array substrate 11, respectively.

A liquid crystal layer is formed between the TFT array substrate 11 and the color filter array substrate 12.

Herein, the ITO film 15 is not formed in an integrated form in entirety on the top surface of the color filter array substrate 12. Instead, the ITO film 15 is divided into a plurality of blocks in the direction of the gate lines. Each block of the ITO film 15 covers a plurality of gate lines. The ITO film 15 is independently formed on a per-block basis.

That is, if the touch panel LCD device includes n gate lines, the n gate lines are divided into m blocks by grouping approximately adjacent n/m gate lines as one block and the ITO film 15 is composed of m blocks, each of which corresponds independently to the ITO film 15.

Alternatively, according to another embodiment of the present invention, the ITO film 15 is not formed in an integrated form in entirety on the top surface of the color filter array substrate 12. Instead, the ITO film 15 is divided into a plurality of blocks in the direction of the data lines. Each block of the ITO film 15 covers a plurality of data lines. The ITO film 15 is independently formed on a per-block basis.

However, the configuration and form of the above-described blocks according to one or more embodiments of the present invention are purely exemplary and are changeable.

A division region of the ITO film 15 divided into blocks as described above corresponds to a division region of the plurality of common electrodes Vcom of the present invention. In other words, the plurality of common electrodes of the present invention may include a total of 210 touch electrodes as illustrated in FIGS. 7a to 9 and the 210 touch electrodes may be divided into 7 groups through multiplexers (MUXes). For example, a first group MUX1 includes $1^{st}$ to $30^{th}$ electrodes connected to a channel 1 of each multiplexer and a second group MUX2 includes $31^{th}$ to $60^{th}$ electrodes connected to a channel 2 of each multiplexer. A seventh group MUX7 includes $181^{th}$ to $210^{th}$ electrodes connected to a channel 7 of each multiplexer.

The multiplexers are elements for applying a touch driving signal to touch electrodes on a group basis in the in-cell touch panel as in the present invention and may be configured inside a readout IC of an SD_IC. In accordance with an embodiment of the present invention, the multiplexers shown in FIGS. 7a to 9 include a total of 30. Each multiplexer has 7 channels and may transmit a touch driving signal through only one of 7 channels. That is, the touch driving signal is applied to 1st to 30th electrodes included in the first group MUX1 through a channel 1 of each of 30 multiplexers. In addition, the touch driving signal is applied to 31th to 60th electrodes included in the second group MUX2 through a channel 2 of each of the 30 multiplexers. In this way, 7 channels of each of the 30 multiplexers are sequentially driven so that the touch electrodes of the groups MUX1 to MUX7 may be divided or sequentially driven. Each of the groups MUX1 to MUX7 of the present invention illustrated in FIGS. 7a to 9 is an element representing a split electrode group connected to each channel of each of the multiplexers. For example, MUX7 indicates an electrode group connected to a channel 7 of each multiplexer.

The embodiments of the present invention are characterized in that the touch driving signal is applied to each of the above-mentioned touch electrode groups MUX1 to MUX7 and the LFD signal is applied to each group of the divided ITO film which is formed in correspondence to the divided touch electrode group. That is, the touch driving signal is not applied to the entire ITO film and the LFD signal is applied to the divided ITO film corresponding to a touch electrode group to which the touch driving signal is applied. In other words, the LFD signal is applied to the divided ITO film formed on the touch electrode group to which the touch driving signal is applied to maintain touch performance and a ground signal GND is applied to the divided ITO film formed on the touch electrode group to which the touch driving signal is not applied to improve EMI noise. The LFD signal applied to the ITO film for enhancement of touch performance and improvement of EMI noise will be described in detail later.

If the touch panel LCD device includes y gate lines, the y gate lines are divided into x blocks each having adjacent y/x gate lines or so. The ITO film 15 is composed of x blocks.

A method of driving the in-cell type touch panel LCD device configured as described above will now be described.

Figure 6:
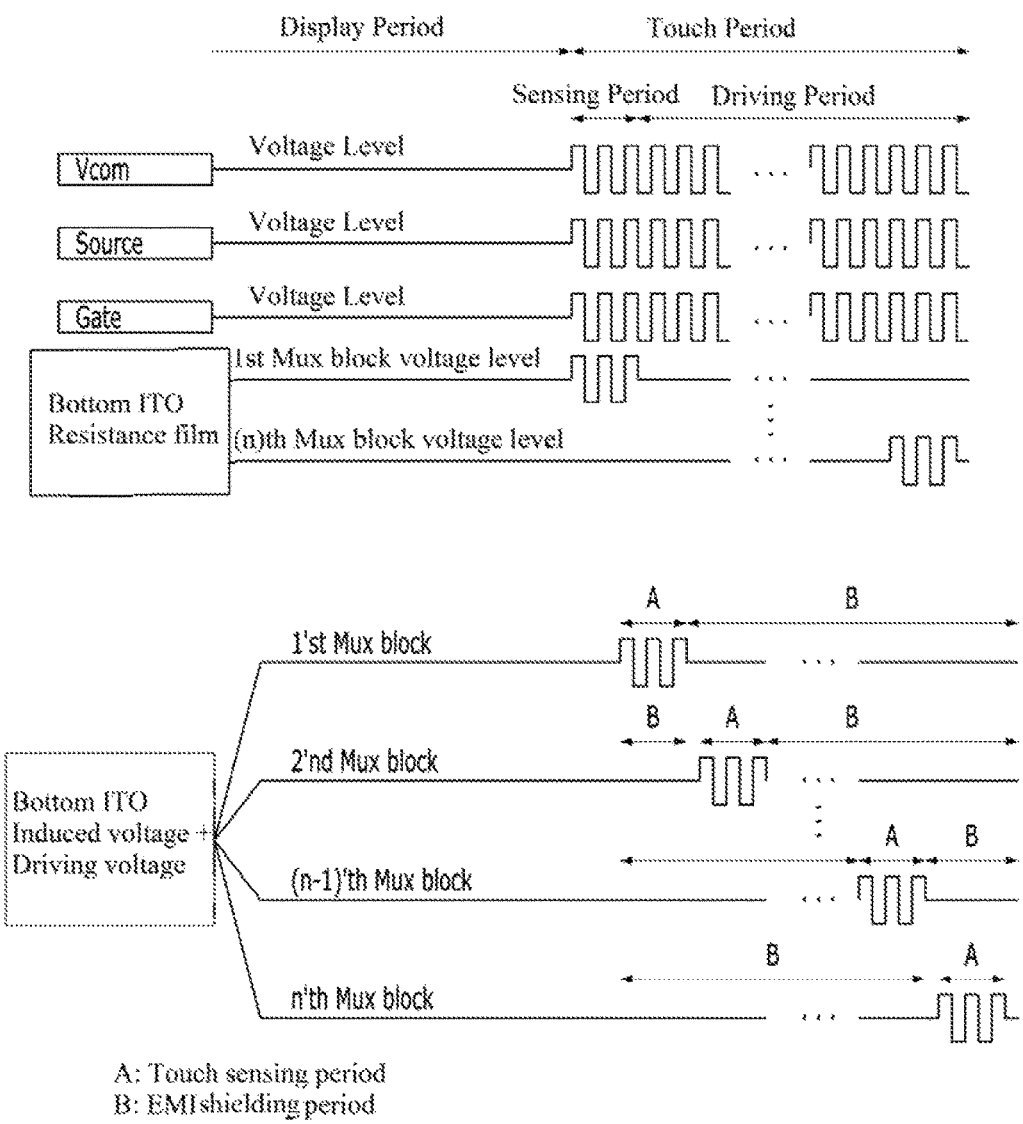
FIG. 6 is a waveform chart illustrating driving of an in-cell type touch panel LCD device using a low-resistance ITO film according to an embodiment of the present invention.

FIG. 6 is a waveform chart illustrating driving of a touch panel LCD device according to an embodiment of the present invention.

As illustrated in FIG. 6, driving of the touch panel LCD device according to an embodiment of the present invention is divided into a display period and a touch sensing period.

During the display period, a scan signal is sequentially applied to a plurality of gate lines Gate, a data voltage is applied to a plurality of data lines Source, and a common voltage is applied to a plurality of common electrodes Vcom, thereby displaying an image. During the display period, the ITO film 15 is grounded.

During the touch sensing period, an LFD signal such as a square wave is applied to the plurality of gate lines Gate, the plurality of data lines Source, and the plurality of common electrodes Vcom, thereby sensing touch. During the touch sensing period, the LFD signal is sequentially applied to the divided ITO film on a per-block basis.

Herein, the LFD signal and application of the LFD signal are disclosed in detail in Korean Patent Application No. 10-2014-0006350 filed on Jan. 17, 2014, assigned to the same assignee as the present application.

In summary, in a panel driven in time-division manner by the display period and the touch sensing period, when the touch driving signal for driving touch is applied to the plurality of common electrodes Vcom during the touch sensing period, initial capacitance between the common electrode and the gate line and between the common electrode and the data line function as unnecessary load that hinders touch sensing of high sensitivity of the common electrode. Therefore, the touch driving signal is supplied not only to the common electrode but also to the gate line and the data line during the touch sensing period, thereby minimizing an influence of initial capacitance between the common electrode and the gate line and between the common electrode and the data line. In this case, the applied LFD signal may have the same phase as the touch driving signal or may be a signal similar to the touch driving signal. In the present invention, although a square wave is illustrated as the LFD signal, a trapezoidal wave, triangular wave, or sine wave signal may be used as the LFD signal, according to type of the touch driving signal or if such a signal can minimize load of the touch driving signal.

That is, in the touch sensing period, the LFD signal is applied to the ITO film 15 of the first block during the first duration, the LFD signal is applied to the ITO film 15 of the second block during the second duration, and the LFD signal is applied to the ITO film 15 of the third block during the third duration. In this way, the LFD signal is sequentially applied to the ITO film 15 of all blocks during the touch sensing period. In addition, during a duration in which the LFD signal is not applied in the touch sensing period, each block of the ITO film 15 is grounded.

Accordingly, a voltage induced in each block of the ITO film 15 includes a touch sensing period (region) A and an EMI shielding period (region) B in each block.

Figure 7A:
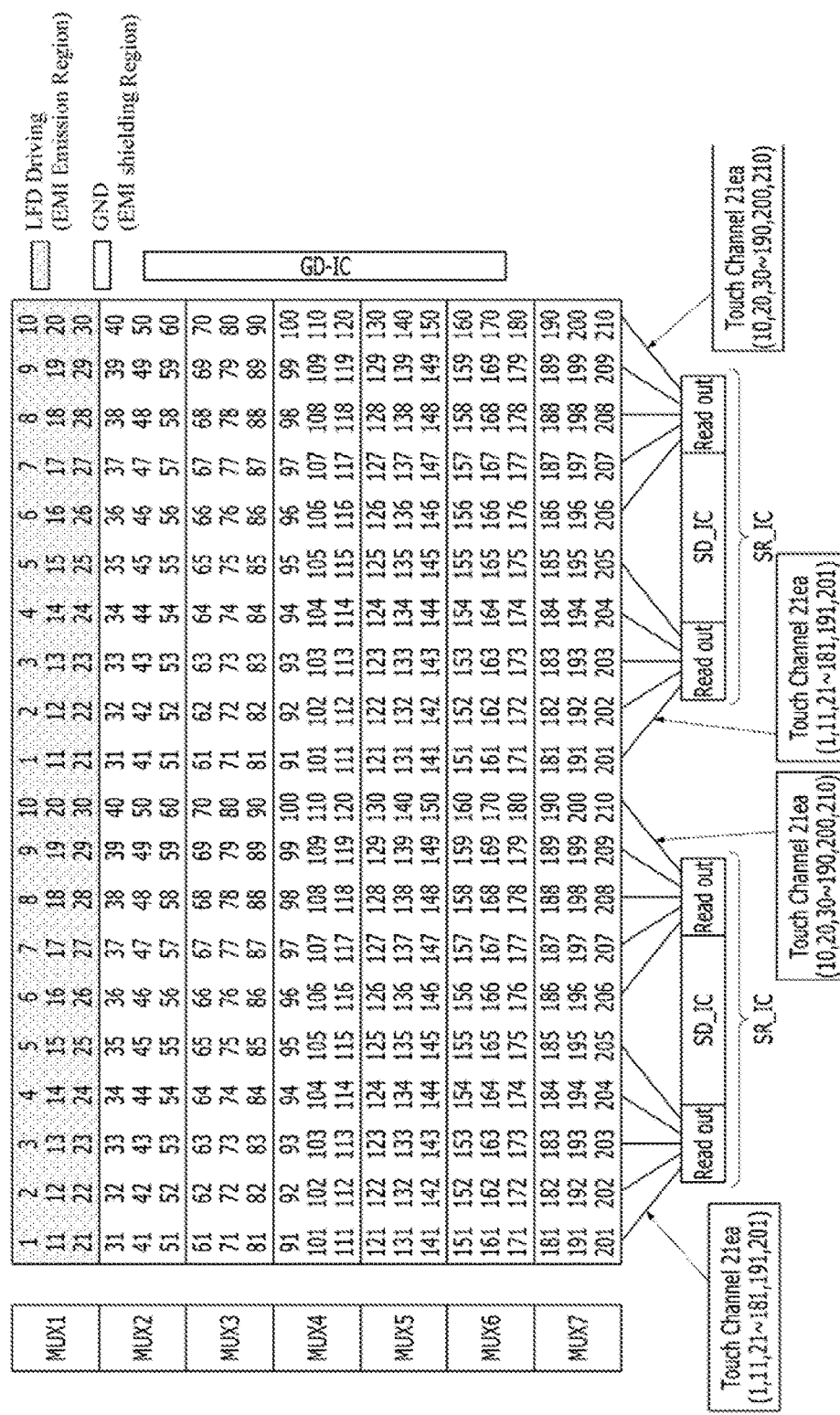
FIGS. 7a to 7c are views for explaining application of an LFD signal to a low-resistance ITO film according to a first embodiment of the present invention.
Figure 7B:
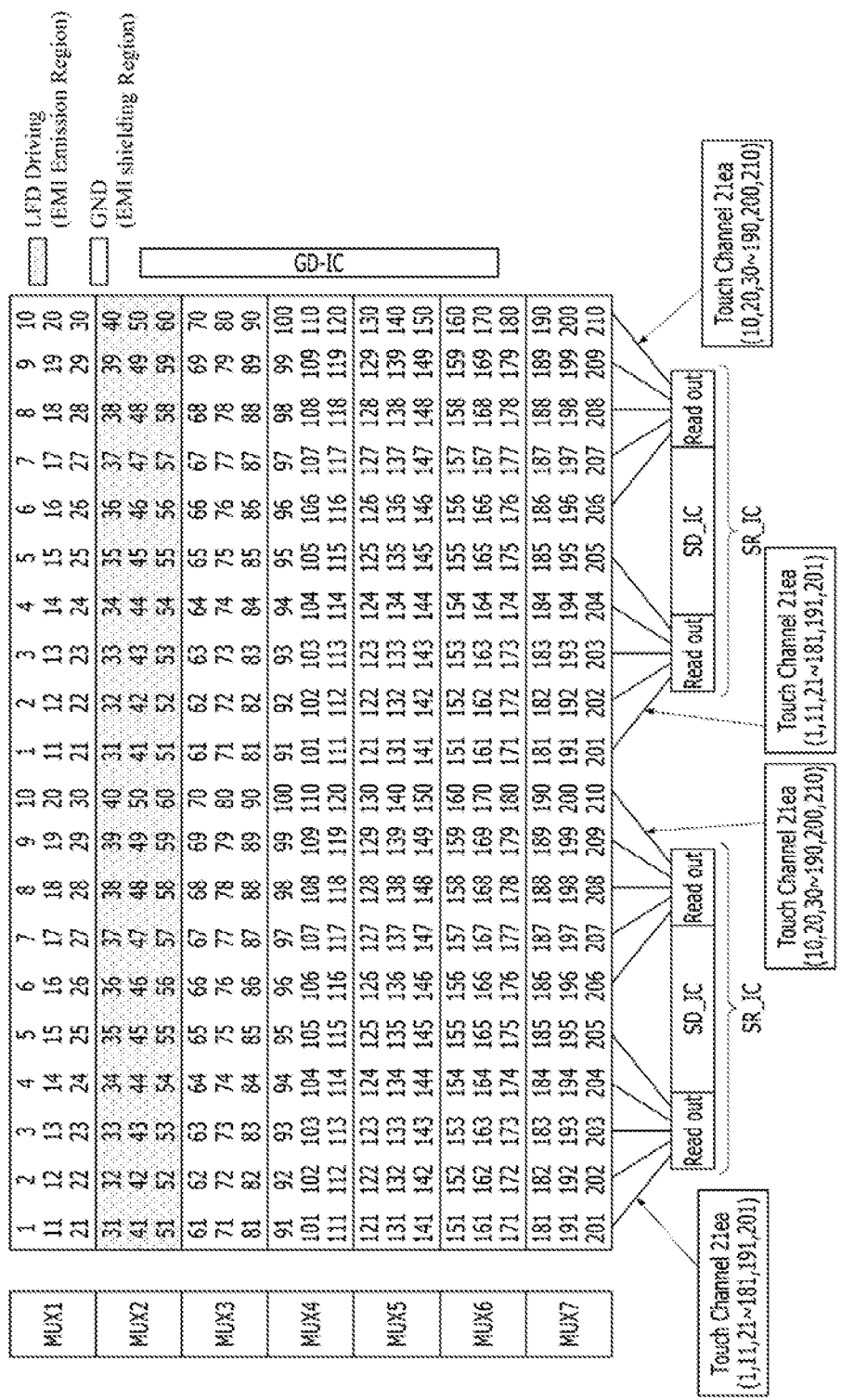
Figure 7C:
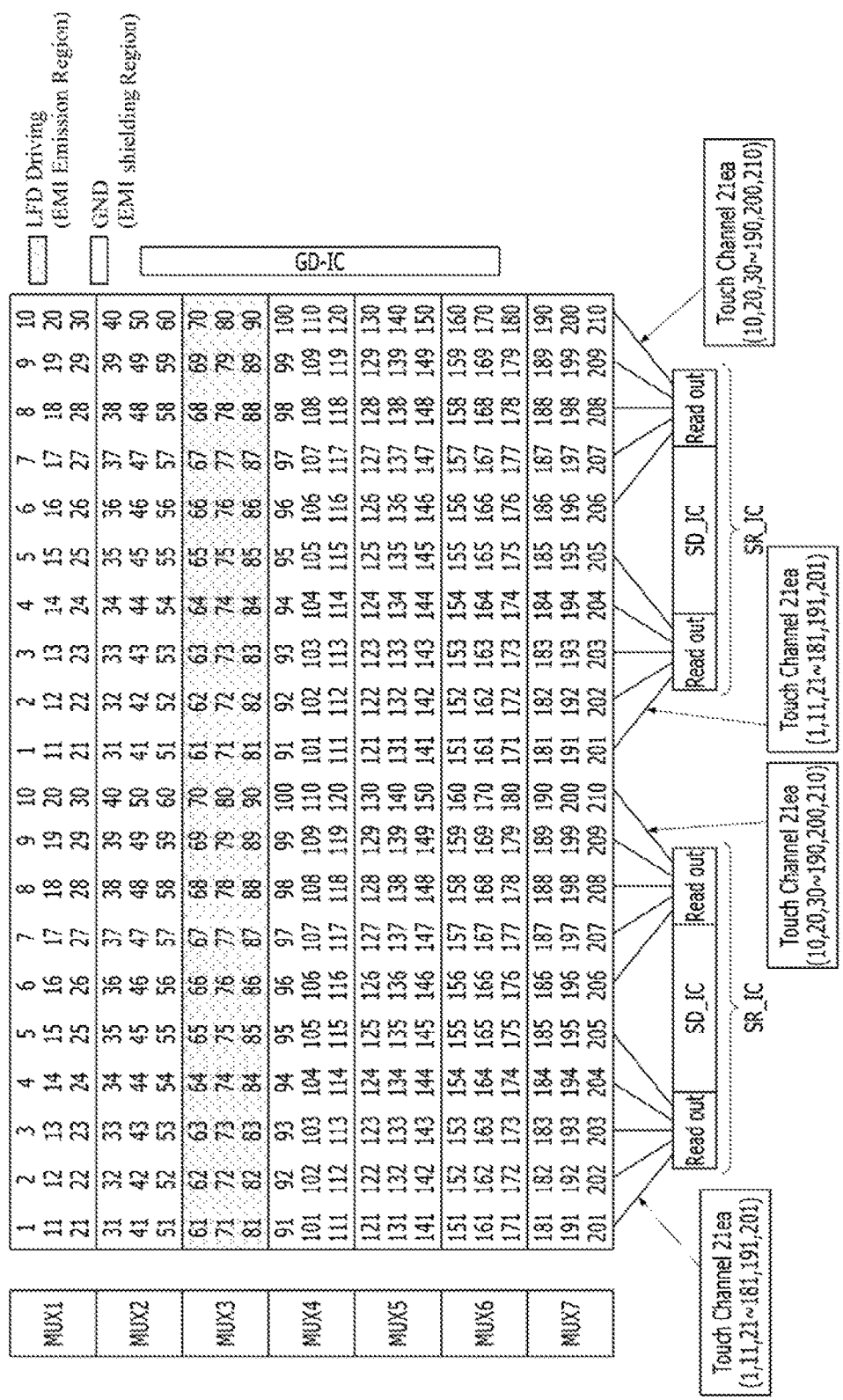

Application of the LFD signal to each block of the ITO film 15 is illustrated in FIGS. 7a to 7c.

FIGS. 7a to 7c are diagrams for explaining application of an LFD signal to a low-resistance ITO film according to a first embodiment of the present invention.

The LFD signal is sequentially applied to blocks of the ITO film 15 during the touch sensing period.

That is, the LFD signal is applied to the ITO film 15 of the first block during the first duration as illustrated in FIG. 7a, the LFD signal is applied to the ITO film 15 of the second block during the second duration as illustrated in FIG. 7b, and the LFD signal is applied to the ITO film 15 of the third block during the third duration as illustrated in FIG. 7c. Thus, the LFD signal is sequentially applied to the ITO film 15 of all blocks during the touch sensing period. In addition, during a duration in which the LFD signal is not applied in the touch sensing period, each block of the ITO film 15 is grounded.

Figure 8:
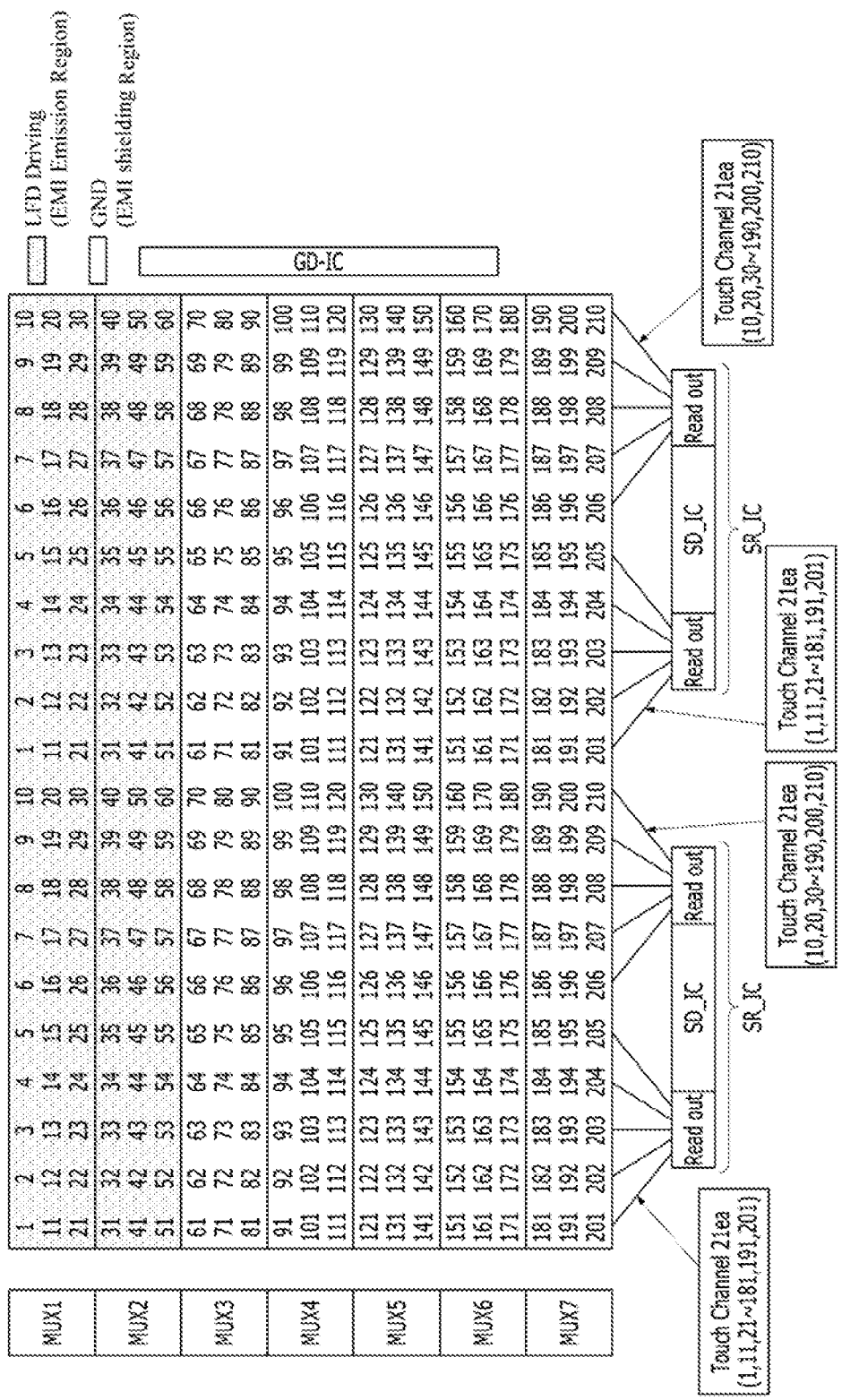
FIG. 8 is a view for explaining application of an LFD signal to a low-resistance ITO film according to a second embodiment of the present invention.

FIG. 8 is a diagram for explaining application of an LFD signal to a low-resistance ITO film according to a second embodiment of the present invention.

While the LFD signal is sequentially applied to each block in FIGS. 7a to 7c, the LFD signal may be repeatedly applied to the ITO film of two adjacent blocks during the touch sensing period.

For example, the LFD signal is applied to the ITO film 15 of the first and second blocks during the first duration, the LFD signal is applied to the ITO film 15 of the third and fourth blocks during the second duration, and the LFD signal is applied to the ITO film 15 of the fifth and sixth blocks during the third duration. Thus, the LFD signal is sequentially applied to the ITO film 15 of all blocks during the touch sensing period. In addition, during a duration in which the LFD signal is not applied in the touch sensing period, each block of the ITO film 15 is grounded.

Figure 9:
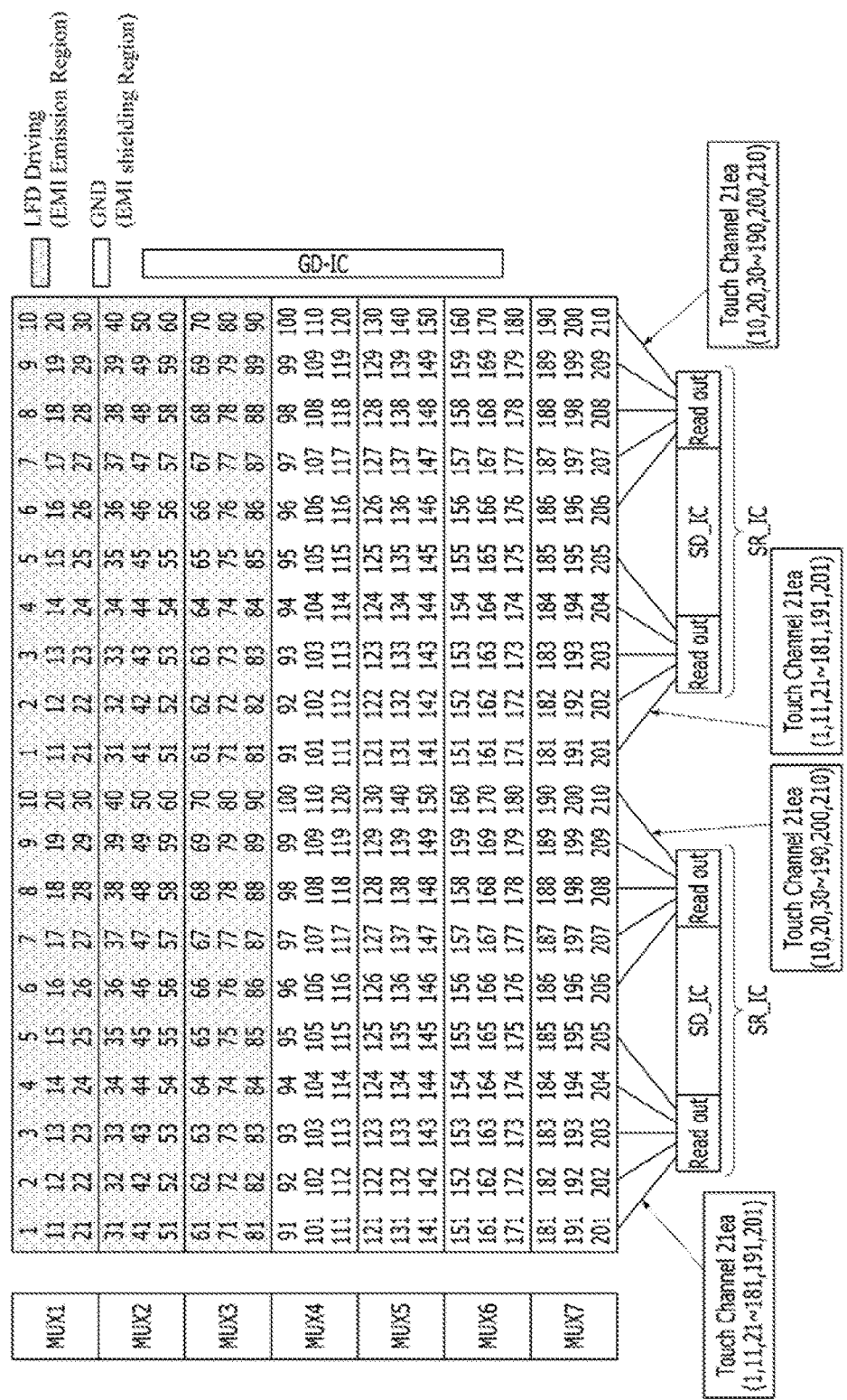
FIG. 9 is a view for explaining application of an LFD signal to a low-resistance ITO film according to a third embodiment of the present invention.

FIG. 9 is a diagram for explaining application of an LFD signal to a low-resistance ITO film according to a third embodiment of the present invention.

As illustrated in FIG. 9, the LFD signal may be repeatedly applied to the ITO film of three adjacent blocks during the touch sensing period.

For example, the LFD signal is simultaneously applied to the ITO film 15 of the first to third blocks during the first duration, the LFD signal is simultaneously applied to the ITO film 15 of the fourth to sixth blocks during the second duration, and the LFD signal is simultaneously applied to the ITO film 15 of the seventh to ninth blocks during the third duration. Thus, the LFD signal is sequentially applied to the ITO film 15 of all blocks during the touch sensing period. In addition, during a duration in which the LFD signal is not applied in the touch sensing period, each block of the ITO film 15 is grounded.

Accordingly, touch sensing performance can be improved and EMI noise can be improved by driving the touch panel using the above-described methods of the present invention.

As described above, according to the touch panel LCD device and the method of driving the same according to the embodiments of the present invention, since all gate lines are divided into a plurality of blocks each having a plurality of gate lines in the direction of gate lines, an ITO film is independently formed on a per-block basis, and the LFD signal is applied to an ITO film on a per-block basis during the sensing period, touch sensing performance is enhanced and EMI noise can be improved.

It will be apparent to those skilled in the art that various modifications and variations can be made in the present invention without departing from the spirit or scope of the invention. Thus, the present invention is intended to cover the modifications and variations of this invention within the scope of the appended claims and their equivalents.

What is claimed is:

1. A touch panel liquid crystal display device, comprising:
a thin film transistor array substrate including a plurality of gate lines, a plurality of data lines, and a plurality of common electrodes serving as touch electrodes;
a color filter array substrate including a black matrix layer and a color filter layer; and
a plurality of indium tin oxide blocks on the color filter array substrate for enhancing a touch sensing performance and improving an electromagnetic interference (EMI) noise, wherein a scan signal, a data signal, and a common voltage are applied to the plurality of gate lines, the plurality of data lines, and the plurality of common electrodes serving as the touch electrodes, respectively, and the plurality of indium tin oxide blocks are grounded, during a display period, wherein a load free driving (LFD) signal is applied to the plurality of gate lines, the plurality of data lines, and the plurality of common electrodes serving as the touch electrodes, and the LFD signal is sequentially applied to the plurality of indium tin oxide blocks, during a touch sensing period, and wherein the plurality of indium tin oxide blocks are divided such that one indium tin oxide block corresponds to a group of common electrodes among the plurality of common electrodes.

2. The touch panel liquid crystal display device according to claim 1, wherein the plurality of indium tin oxide blocks are divided in a direction of one of the gate lines or one of the data lines.

3. The touch panel liquid crystal display device according to claim 1, wherein a ground signal is applied to the plurality of indium tin oxide blocks when the LFD signal is not applied during the touch sensing period.

4. The touch panel liquid crystal display device according to claim 1, wherein the LFD signal is sequentially applied to each of the plurality of indium tin oxide blocks.

5. The touch panel liquid crystal display device according to claim 1, wherein the LFD signal is simultaneously applied to two or three adjacent indium tin oxide blocks.

6. A method of driving a touch panel liquid crystal display device including a liquid crystal panel having a plurality of gate lines, a plurality of data lines, and a plurality of common electrodes serving as touch electrodes and a plurality of indium tin oxide blocks on the liquid crystal panel, wherein the plurality of indium tin oxide blocks are divided such that one indium tin oxide block corresponds to a group of common electrodes among the plurality of common electrodes, the method comprising:

applying a scan signal, a data signal, and a common voltage to the plurality of gate lines, the plurality of data lines, and the plurality of common electrodes serving as the touch electrodes, respectively, and grounding the plurality of indium tin oxide blocks, during a display period; and applying a load free driving (LFD) signal to the plurality of gate lines, the plurality of data lines, and the plurality of common electrodes, and sequentially applying the LFD signal to the plurality of indium tin oxide blocks, during a touch sensing period.

7. The method according to claim 6, wherein a ground signal is applied to the plurality of indium tin oxide blocks when the LFD signal is not applied during the touch sensing period.

8. The method according to claim 6, wherein the LFD signal is sequentially applied to each of the plurality of indium tin oxide blocks.

9. The method according to claim 6, wherein the LFD signal is simultaneously applied to two or three adjacent indium tin oxide blocks.

10. A touch panel liquid crystal display device, comprising:

a thin film transistor array substrate including a plurality of gate lines, a plurality of data lines, and a plurality of common electrodes serving as touch electrodes;

a color filter array substrate including a color filter layer; and a plurality of indium tin oxide blocks on the color filter array substrate for enhancing a touch sensing performance and improving an electromagnetic interference (EMI) noise, wherein a scan signal, a data signal, and a common voltage are applied to the plurality of gate lines, the plurality of data lines, and the plurality of common electrodes serving as the touch electrodes, respectively, and the plurality of indium tin oxide blocks are grounded, during a display period, wherein a load free driving (LFD) signal is applied to the plurality of gate lines, the plurality of data lines, and the plurality of common electrodes serving as the touch electrodes, and the LFD signal is sequentially applied to the plurality of indium tin oxide blocks, during a touch sensing period, wherein the plurality of indium tin oxide blocks are divided such that one indium tin oxide block corresponds to a group of common electrodes among the plurality of common electrodes, and wherein a ground signal is applied to the plurality of indium tin oxide blocks when the LFD signal is not applied during the touch sensing period.

11. The touch panel liquid crystal display device according to claim 10, wherein the plurality of indium tin oxide blocks are divided in a direction of one of the gate lines or one of the data lines.

12. The touch panel liquid crystal display device according to claim 10, wherein the LFD signal is simultaneously applied to two or three adjacent indium tin oxide blocks.

13. The touch panel liquid crystal display device according to claim 10, wherein the plurality of common electrodes are disposed between the plurality of gate lines and the plurality of indium tin oxide blocks.

14. The touch panel liquid crystal display device according to claim 1, wherein the plurality of common electrodes are disposed between the plurality of gate lines and the plurality of indium tin oxide blocks.

15. The method according to claim 6, wherein the plurality of common electrodes are disposed between the plurality of gate lines and the plurality of indium tin oxide blocks.

* * * * *